United States Patent [19]

Nishimura et al.

[11] Patent Number: 4,779,962

[45] Date of Patent: Oct. 25, 1988

[54] OPTICAL DEVICE

[75] Inventors: Yukuo Nishimura, Sagamihara; Masahiro Haruta, Tokyo; Hirohide Munakata, Yokohama; Yoko Kuwae; Toshihiko Miyazaki, both of Tokyo; Satoshi Yuasa, Yokohama, all of Japan

[73] Assignee: Canon Kabushiki Kaisha, Tokyo, Japan

[21] Appl. No.: 120,709

[22] Filed: Nov. 16, 1987

Related U.S. Application Data

[63] Continuation of Ser. No. 810,248, Dec. 18, 1985, abandoned.

[30] Foreign Application Priority Data

| Dec. 24, 1984 | [JP] | Japan | 272365 |
| Dec. 24, 1984 | [JP] | Japan | 272366 |
| Dec. 24, 1984 | [JP] | Japan | 272367 |
| Dec. 24, 1984 | [JP] | Japan | 272368 |
| Dec. 24, 1984 | [JP] | Japan | 272369 |
| Dec. 24, 1984 | [JP] | Japan | 272370 |

[51] Int. Cl.$^4$ .............. G02F 1/01; G09G 3/34
[52] U.S. Cl. .................. 350/355; 350/362; 350/267; 340/788
[58] Field of Search .............. 350/355, 267, 359, 360, 350/393, 330, 331 R, 350 R, 351, 362; 358/233, 236; 340/787, 788, 783, 758, 752, 763

[56] References Cited

U.S. PATENT DOCUMENTS 4,419,663 12/1983 Kohashi ............................ 350/355
4,660,938 4/1987 Kazan ............................... 350/355

FOREIGN PATENT DOCUMENTS 2505059 8/1975 Fed. Rep. of Germany.

OTHER PUBLICATIONS

Beni et al., Appl. Phys. Lett., vol. 38, No. 4, Feb. 1981, pp. 207–209.

Primary Examiner—Eugene R. LaRoche
Assistant Examiner—Michael B. Shingleton
Attorney, Agent, or Firm—Fitzpatrick, Cella, Harper and Scinto

[57] ABSTRACT

An optical device is provided which comprises a liquid layer containing a liquid-absorbable and releasable polymer that absorbs and releases a liquid under the action of an electric field and at least one pair of electrodes holding the liquid layer therebetween. The liquid may be colored, and alternatively the liquid-absorbable and releasable polymer may be colored.

19 Claims, 2 Drawing Sheets

OPTICAL DEVICE

This application is a continuation of application Ser. No. 810,248 filed 12/18/85 abandoned.

BACKGROUND OF THE INVENTION

1. Field of the Invention

This invention relates to an optical device for the use in display devices, light modulator devices, etc., and particalarly to a novel optical device utilizing the swelling and shrinking of gel under action of an electric field.

2. Description of the Prior Art

Non-luminous display devices have been regarded as important because they can produce natural color tone and do not cause any fatigue to human eyes, and they include, for example, electrochromic display devices (ECD), liquid crystal display devices (LCD), etc. However, their quality and performance are not satisfactory. For example, ECD is as low in display contrast that it is hardly observable in a dim place and discrimination of fine image is hard at a distance.

On the other hand, LCD has such another disadvantage as a restricted angle of visual field, besides the above noted disadvantages.

Similar problems exist even when they are used in the light modulator devices such as light shutters, etc.

SUMMARY OF THE INVENTION

An object of the present invention is to solve the problems in the prior art, and to provide a clear and improved optical device.

Another object of the present invention is to provide a display device capable of producing a natural color tone and while eliminating fatigue to human eyes.

Further object of the present invention is to provide an optical device that can be readily prepared and also utilized as a light modulator device.

According to an aspect of the present invention, there is provided an optical device, which comprises a liquid layer containing a liquid-absorbable and releasable polymer that absorbs and releases a liquid by action of electric field, and at least one pair of electrodes holding the liquid layer therebetween.

According to another aspect of the present invention, there is provided an optical device, which comprises a liquid layer containing a liquid-absorbable and releasable polymer that absorbs and releases a liquid by action of electric field and a colored liquid, and at least one pair of electrodes holding the liquid layer therebetween.

According to a further aspect of the present invention, there is provided an optical device, which comprises a liquid layer contianing a liquid-absorbable and releasable colored polymer that absorbs and releases a liquid by action of an electric field, and at least one pair of electrodes holding the liquid layer therebetween.

DETAILED DESCRIPTION OF THE PREFERRED EMBODIMENTS

The optical device according to the present invention has a broad meaning including a display device, a light modulator device, etc.

The present invention will be described in detail below, referring to the drawings.

Figure 1:
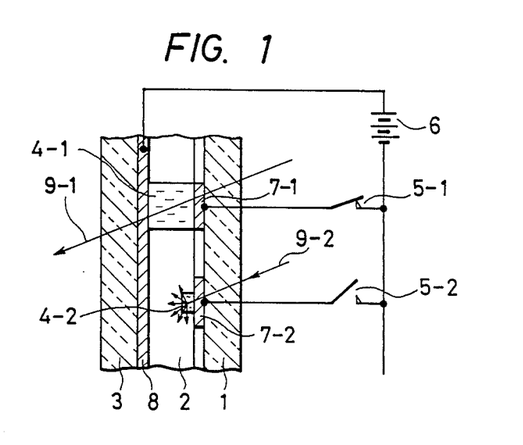
FIG. 1 is a view showing a schematic structure of an optical device according to the present invention and explaining its light modulation principle.

FIG. 1 is a view showing a schematic structure of an optical device of a transmission type according to the present invention, where numeral 1 shows a substrate, 2 a gel-containing liquid layer, 3 a transparent protective plate, 7 an image element electrode or signal electrode (which will be hereinafter referred to merely as "image element electrode"), and 8 a counter electrode. The optical device is constituted of laminated layers, as shown in the drawings.

The substrate 1 includes a transparent substrate, for example, glass, plastic, etc., and an intransparent substrate, for example, metal such as silicon wafer, a ceramic, aluminum, etc., and an opaque plastic., etc. The same materials as for the transparent substrate are used for the transparent protective plate 3.

The gel-containing liquid layer 2 is a layer containing a liquid and a liquid-absorbable and releasable polymer.

The term "gel" used in the present invention means a state of a liquid-absorbable and releasable polymer (reticular polymer) containing a liquid. The polymer for use in the present invention has a property of absorbing and releasing a liquid under the action of an electric field.

The liquid-absorbable and releasable polymer having such a property can be classified into two major groups, one of which belongs to polymers which will absorb a liquid under action of an electric field to undergo swelling and which will release the liquid by eliminating the electric field (or by applying an inversed electric field under a special condition) to undergo shrinking. These may include, for example, electrically chargeable polymers obtained from an acrylamide derivative as the main component and a cross-linkable monomer, such as Enzafix P-SH (tredemark of a product made by Wako Junyaku K.K. Japan), polymers obtained from as N-isopropylacylamide deviative as the main component and a cross-linkable monomer, such as isopropylacrylamide-acrylic acid-divinylbenzene copolymer, etc. The second major group of polymers is one which will release a liquid under action of an electric field to undergo shrinking, and will absorb the liquid on eliminating the electric field (or by applying an inversed electric field under a special condition. This group may include, for example, electrically chargeable polymers obtained from an acrylamide derivative as the main component and a cross-linkable monomer, such as Enzafix P-SH (trademark of a product made by Wako Junyaku K.K., Japan) or polymers obtained from an N-isopropylacylamide derivative as the main component and a cross-linkable monomer, such as an isopropylacrylamideacrylic acid-divinylbenzene copolymer, etc.

The liquid to be filled in the gel-containing liquid layer 2 includes water, organic solvents such as methanol, ethanol, acetone, acrylonitrile, dimethylformamide, pyridine, dimethylsulfoxide, hexamethylphosphamide, dimethylacetamide, etc. and their mixture.

When a colored liquid is used in the gel-containing liquid layer 2 to enhance the contrast or change the color tone (FIG. 3), a solution or dispersion of a coloring material in the said solvent is used, where it is necessary that the coloring material does not penetrate into the gel owing to any physical or chemical factor.

The coloring material includes, for example, dyes such as poly A-133, Poly R-478, Poly S-119, Poly T-128 (all the foregoing products being made by Dinapole Co.), Seikagen W-Blue-BK 1600, Seikagen W-Blue-1300 (all the foregoing products being made by Dainichi Seika K.K., Japan), and pigments such as Benzidine yellow-GR, Chromophthal Orange 4R, toluidine Maroon MT-2, vulkan Fast Orange GG, Permanent Red F5R, Lithol Rubin GK, Brilliant Carmine 3B, Sanyo Red B-G511, Monastral maroon Permanent Red E5B, permanent Pink E, Phthalocyanine Blue, Phthalocyanine green, Naphthol Green BN, Diamond black etc.

When a colored polymer is used (FIG. 4) the coloring material needs to be confined in the network of the reticular polymer or the inside surface thereof.

The coloring material can be confined therein by chemical binding, i.e. by chemically binding the coloring material with a reticular polymer, or by enclosing macromolecules in the polymer network by three dimensional cross-linking reaction in the presence of macromolecules of coloring material. The coloring material herein used includes reactive dyes such as Diamira yellow G, sumifix Red B, Diamira Brilliant Green 6B, Celmazol Brilliant Blue G, etc. beside the above-mentioned coloring materials.

When polymer that absorbs a liquid under action of an electric field and releases the liquid on elimination of the electric field is used in the present invention, it is preferable that the gel particles in the gel-containing liquid layer 2 are so small as to show good light scattering and refracting properties or have fine irregularity on the surface, without any restriction to the shape, arrangement, number, etc. It is preferable that the gel or an assembly of fine gel particles is provided in accodance with the shape, size or arrangement of image elements or apertures(which will be hereinafter refered to merely as "image elements"). The volume occupied by one gel particle must be significantly smaller than the image element space (namely, the image component area multiplied by the thickness of the gel-containing liquid layer), and is preferably not more than ½ of image component space.

The gel is preferably fixed to one of a pair of electrodes by a chemical or physical means.

When polymers that releases a liquid by action of an electric field and absorb the liquid in the absence of electric field are used, the size, shape and arrangement of gel in the gel-containing liquid layer can be selected as desired. The gels can be filled, as integrated, in the gel-containing liquid layer 2, or can be filled therein a state of cracked mass, dispersion or block.

Gel or an assembly of fine gel perticles can be provided in accordance with the shape, arrangement, etc. of image element or apertures(which will be hereinafter referred to as "image element"), Generally, the size of one gel particle is preferably approximately equal to that of the image element. The thickness of gel-containing liquid layer 2 is preferably 1 to 1,000 μm, more preferably 1 to 100 μm.

Image element electrodes (7-1) and (7-2) are provided on the substrate (or transparent protective plate 3) in accordance with the image element, and, if necessary, can take any shape, such as segment, stripe, dot matrix, etc. The length at one side of the image element electrodes (7-1) and (7-2) is preferably 10 μm to 1 cm, more preferably 50 μm to 1,000 μm in the case of the dot matrix shape. A Transparent electrode such as indium-tin oxide (I.T.O), etc. can be used, if required.

The counter electrode 8 is provided on the transparent protective plate 3 (or substrate) to face the image element electrodes (7-1) and (7-2) through the gel-containing liquid layer 2, and can be a transparent electrode, if required.

Image formation or light modulation principle according to the present invention will be described below, referring to FIG. 1 showing an optical device of a transmission type.

When a switch (5-2) is off, i.e., when no electric field is applied to gel (4-2) in contact with an image element electrode (7-2), the gel (4-2) stays in a very minute shrunk state. Thus, the light (9-2) introduced into the gel (4-2) is scattered or refracted by the gel (4-2), and its rectilinear propagation is inhibited, because the gel in the very, small state has light-scattering and refracting properties.

On the other hand, when a switch (5-1) is on, i.e., when gel (4-1) is under action of electric field, the reticular polymers of the gel are negatively charged, and thus are pulled toward the electrode 8. Consequently, the gel undergoes swelling to the state (4-1). As a result of swelling, th light-scattering and refracting properties of the gel are lost, and the light (9-1) can propagate rectilinearly therethrough. through.

In the case of reticular polymers that are positively charged in the liquid, similar function and effect can be also obtained by reversing the polarity of the electrode in FIG. 1.

When the switoh (5-1) is off, the gel shrinks and returns to the original state, because the reticular polymer molecules are made longer under the action of electric field than the equilibrium length, and can gain a negative presure, i.e. a restoring force when the electric field is eliminated. As a result, the light introduced thereinto is scattered or refracted again, and its rectilinear propagation is inhibited. When a reversed electric field is further applied thereto, then the shrinking speed can be accelerated.

The present invention is based on an application of this principle to an optical device, where an optical difference is produced by electrically controlling swelling and shrinking of a gel, thereby obtaining a display or light modulation.

The foregoing description has been made of an optical device of transmission type, and the same principle is also applicable to an optical device of reflection type (not shown in the drawing).

Figure 2:
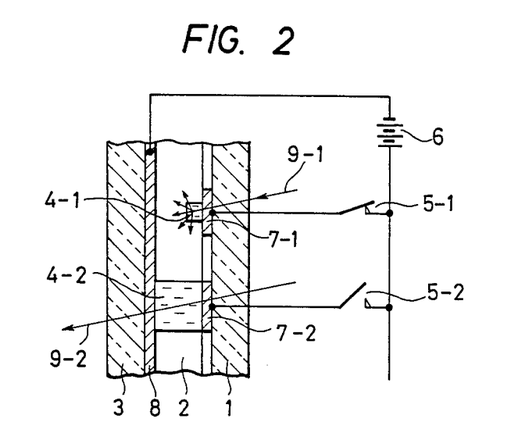
FIGS. 2 to 4 are views of schematic structure according to other embodiments of the present invention.

FIG. 2 shows an embodiment of a polymer that can release a liquid by action of an electric field to undergo shrinking and can absorb the liquid in the presence of electric field to undergo swelling.

When a switch (5-2) is off, i.e., when the gel (4-2) in contact with an image element electrode (7-2) is not under the action of electric field, the gel remains swollen (4-2). Thus, the light (9-2) introduced into the gel (4-2) can pass through the gel-containing liquid layer 2 without an scattering or refraction by the gel (4-2).

On the other hand, when a switch (5-1) is on, i.e., when the swollen gel is under the action of an electric field. the reticular polymers of gel are pulled toward the electrode (7-1) because the reticular polymers are negatively charged, and undergoes shrinking into gel (4-1). Thus, the light (9-1) introduced into the gel (4-1) undergoes scattering or refraction, and its rectilinear propagation is inhibited, because the gel in a very small state has light scattering and refracting properties.

When minute gel particles are densely filled. gaps are formed within the gel owing to the diminution of gel perticles, and similar optical effect can be obtained. Furthermore, a similar function and effect can be obtained with reticular polymers that can be positively charged in the liquid, where they are shrunk to the opposite side to that of FIG. 2, that is, the side of counter electrode 8.

When the switch 5-1 is turned off, the gel undergoes swelling and returns to the original state.

The reticular polymer molecules are compressed to less than the equilibruim length under the action of an electric field, and thus a positive pressure, i.e. a restoring force, can be gained by removing the electric field. As a result, light can pass through the gel-containing liquid layer 2 without any scattering or refraction. When a reversed electric field is further applied thereto, then the swelling speed can be accelerated.

Figure 3:
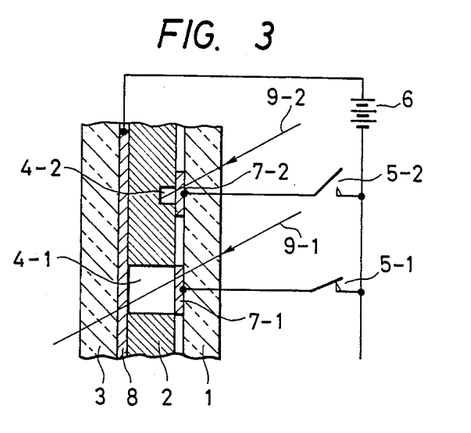

FIG. 3 shows another embodiment of using a colored liquid in the gel-containing liquid layer, where the image formation or light modulation takes place as follows.

When a switch (5-2) is off, i.e., when gel (4-2) in contact with an image component electrode (7-2) is not under the action of electric field, the gel (4-2) is maintained in a shrunk condition in a very small state. Thus, the light (9-2) introduced into the gel (4-2) and its neighborhood is absorbed by the colored liquid in the gel-containing liquid layer or partially absorbed thereby, and weakened.

On the other hand, when a switch (5-1) is on, i.e., when the gel is under the action of an electric field, the reticular polymers of gel are pulled toward the positively charged electrode 8, because the polymers are negatively charged. Thus, the gel (4-1) is swollen until it contacts or approaches the electrode 8. As a result, the colored liquid retreats by the amount of swelling of the gel, and the light (9-1) put therein can pass through the gel-containing liquid layer 2.

Even when positively chargeable reticular polymers in the liquid are used, similar function and effect can be obtained by reversing the polarity of the electrode shown in FIG. 3.

When the switch (5-1) is turned off, the gel undergoes shrinking and returns to the original state. The reticular polymer molecules are made longer than the equilibrium length under the action of the electric field, and a negative pressure, that is, a restoring force, can be gained by eliminating the electric field. As a result, the light put therein scattered or refracted again, and its rectilinear propagation is inhibited. When a reversed electric field is further applied thereto, then the shrinking speed can be accelerated.

Light modulation with a colored polymer will be described, referring to FIG. 4.

When a switch (5-2) is off, i.e., when colored gel (4-2) in contact with an image component electrode (7-2) is not under the action of electric field, the colored gel (4-2) stays in a very small shrunk state. Thus, the light (9-2) introduced into the colored gel (4 2) is scattered or absorbed by the colored gel, or partially scattered or absorbed, and weakend.

On the other hand, when a switch (5-1) is on, i.e., when the colored gel is under the action of electric field, the reticular polymers of colored gel are pulled toward the positively charged electrode 8, because the polymers are negatively charged, and the colored gel (4-1) undergoes swelling when it contacts or approaches the electrode 8. As a result, the coloring material is diluted corresponding to the amount of swelling of the colored gel, and the light (9 1) introduced thereinto can pass through the gel-containing liquid layer 2 without any inhibition.

Figure 4:
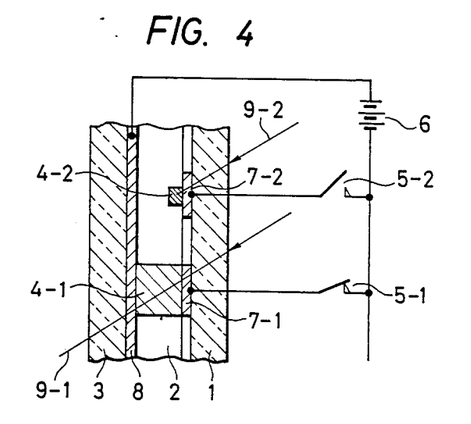

Even when positively chargeable reticular polymers in the liquid are used, similar function and effect can be obtained by reversing the polarity of the electrode in FIG. 4.

When the switch (5-1) is turned off, the colored gel undergoes shrinking and returns to its original condition. The reticular polymer moecules are made longer than the equilibrium length under the action of the electric field, and a negative pressure, that is, a restoring force, is gained by removing the electric field. As a result, the light put therein is scattered or refracted again, and its rectilinear propagation is inhibited. When a reversed electric field is further applied thereto, then the shrinking speed can be accelerated.

The foregoing description has been made on an optical device of a transmission type, and the same principle is also applicablc to an optical device of a reflection type.

In the case of polymers that can release a liquid by action of electric field and can absorb the liquid in the absence of electric field, the dominant light modulation principle is basically the same as described above, though the function is quite contrary thereto.

The present invention will be described in detail below, referring to Examples.

EXAMPLE 1

Preparation of an optical device

The present optical device was prepared in the following manner.

0.75 g of acrylamide, 0.2 g of sodium acrylate, 0.02 g of N,N-methylenebisacrylamide, and 50 $\mu$l of tetramethylethylenediamine were dissolved in 14 ml of water.

Separately, 0.02 g of ammonium persulfate was dissolved in 1 ml of water, the thus prepared solution was mixed with the first solution. Than, the obtained monomer solution was immediately added to 100 ml of liquid paraffin containing 1 ml of sorbitan trioleate, and vigorously stirred in a nitrogen atmosphere.

After completion of polymerization, the thus formed polymers were washed with hexane to remove the liquid paraffin therefrom, and then poured into acetone to coagulate. Then, washing of the polymers was repeated alternately with an aqueous 50% acetone solution and an aqueous 70% acetone solution, and finally, tho polymers were dispersed in an aqueous 50% acetone solution.

A glass plate, 50×50 mm, patternwise vapordeposited with a semi-transparent platinum film having a thickness of 150 Å as an anode and a nickel plate, 50×50 mm, as a cathode were immersed in the polymer dispersion, and a predetermined voltage was applied therebetween to coagulate the polymer particles on the platinum pattern.

The thus obtained glass plate and another glass Plate with a 2000Å-thick I.T.O film were confronted with each other, and an aqueous 60% acetone solution was filled in the clearance between the glass plates, using a Mylar film (trade name of a polyester supplied by Du Pont) having a thickness of 20 $\mu$m as a spacer.

Display and light modulation

When a voltage of 0.8 to 5V was applied between the platinum semi transparent electrode as a cathode and the I.T.O electrode as an anode in the thus prepared optical device, the gel between the electrodes was swollen to show a light transmissivity On the other hand, when the switch was turned off, the gel shrank and recovered the milk-white color and opacity.

As a result of repeated tests, the reproducibility was confirmed. Thus, the display function and the light modulation function were confirmed.

EXAMPLE 2

Preparation of an optical device

The present optical device was prepared in the following manner.

0.75 g of acrylamide, 0.25 g of sodium methacrylate, 0.02 g of N,N-methylenebisacrylamide, and 50 μl of tetramethylethylenediamine were dissolved in 14 ml of water.

Separately, 0.02 g of ammonium persulfate was dissolved in 1 ml of water, and the thus prepared solution was added to the first solution. Then, the thus obtained monomer solution was immediately added to 100 ml of liquid paraffin containing 1 ml of sorbitan trioleate and vigorously stirred in a nitrogen atmosphere.

After completion of polymerization, the thus formed polymer was washed with hexane to remove the liquid paraffin therefrom, and then poured into acetone to coagulate. Then, washing of the polymers was repeated alternately with an aqueous 40% acetone solution and with an aqueous 70% acetone solution, and finally the polymers were dispersed in an aqueous 45% acetone solution.

A glass plate, 50×50 mm, patternwise vapor deposited with a platinum semi-transparent film having a thickness of 150 Å as an anode and a nickel plate, 50×50 mm, as a cathode were dipped in the polymer dispersion, and a predetermined voltage was applied therebetween to coagulate the polymer particles on the platinum pattern.

The thus obtained glass plate and a glass plate having an I.T.O film having a thickness of 2,000 Å were confronted with each other, and an aqueous 60% acetone solution was filled in the clearance between the glass plates, using a Mylar film having a thickness of 20 μm as a spacer.

Display and light modulation

The same results as in Example 1 were obtained, when tested in the same manner as in Example 1.

EXAMPLE 3

Preparation of an Optical Device

The present optical device was prepared in the following manner.

0.75 g of acrylamide, 0.2 g of sodium acrylate, 0.02 g of N,N-methylenebisacrylamide, and 50 μl of tetramethylethylenediamine were dissolved in 14 ml of water.

Separately, 0.02 g of ammonium persulfate was dissolved in 1 ml of water, and the thus prepared solution was added to the first solution. Then, the thus obtained monomer solution was immediately added to a solvent mixture of 23 ml of chloroform, 75 ml of toluene 1 ml of sorbitan trioleate, and vigorously stirred in a nitrogen atmosphere.

After completion of polymerization, the thus obtained polymers were washed with hexane and then poured into acetone to coagulate. Then, washing of the polymers was repeated alternately with an aqueous 50% acetone solution and an aqueous 70% acetone solution, and finally the polymers were dispersed in an aqueous 50% acetone solution.

The thus prepared polymer dispersion was sealed in between a glass plate patternwise provided with an I.T.O electrode having a thickness of 2,000 Å by sputtering and another glass plate vapor-deposited with a platinum having a thickness of 150 Å, using a Mylar film having a thickness of 20 μm as a spacer.

Display and light modulation

When a voltage of 0.8 to 5V was applied between the platinum semi-conductor electrode as a cathode and the I.T.O electrode as an anode in the thus prepared optical device, the gel existing between the electrodes shrank and became milk-white and opaque On the other hand, when the switch was turned off, the gel underwent swelling and recovered the original transmissivity.

As a result of repeated tests, the reproducibility was confirmed. The display function and the light modulation function were thus confirmed.

EXAMPLE 4

Preparation of an optical device

The present optical device was prepared in the following manner.

0.75 g of acrylamide, 0.20 g of sodium acrylate, 0.02 g of N,N-methylenebisacrylamide, and 50 μl of tetramethylethylenediamine were dissolved in 14 ml of water.

Separately, 20 mg of ammonium persulfate was dissolved in 1 ml of water, and the thus prepared solution was mixed with the monomer solution. Then, the mixture was poured into a solvent mixture of 25 ml of carbon tetrachloride, 75 ml of toluene and 1 ml of sorbitan trioleate and vigorous stirred in a nitrogen atmosphere.

After completion of polymerization, the thus formed polymers were thoroughly washed with hexane, and then with acetone to coagulate. Then, washing of the polymers was repeated alternately with an aqueous 50% acetone solution and with an aqueous 70% acetone solution, and finally the polymers were dispersed in an aqueous 50% acetone solution.

A glass plate, 50×60 cm, patternwise vapor-deposited with a platinum semi-transparent film having a thickness of 150 Å as an anode and a nickel plate as a cathode were dipped in the polymer gel dispersion, and a voltage of 0.8V was applied therebetween to coagulate the polymer gel on the platinum pattern.

The gel-coagulated platinum electrode as a cathode and a glass plate, 50×60 mm, provided with an I.T.O film having a thickness of 2,000 Å on the entire surface by sputtering as an anode were confronted with each other while inserting a Mylar film having a thickness of 20 um as a spacer therebetween.

An aqueous 60% acetone solution containing Brilliant Carmine 3B (C.I. Pigment Red 60: C.I. 16015-Lake) as dispersed in a ball mill, was filled in the clearance between the electrodes to prepare an optical device.

Display and light modulation

When a voltage of 0.8 to 5V was applied between the platinum semi-transparent electrode as a cathode and the I.T.O electrode as an anode in the thus prepared optical device, the gel between the electrodes underwent swelling and showed light transmission.

On the other hand, when the switch was turned off to eliminate to applied voltage the gel shrank and recovered the color of the colored liquid.

As a result of repeated tests, the reproducibility was confirmed. The display action and the light modulation action were thus confirmed.

EXAMPLE 5

Preparation of an optical device

The present optical device was prepared in the following manner.

0.75 g of acylamide, 0.20 g of sodium acrylate, 0.02 g of N,N methylenebisacrylate, and 50 ul of tetramethylethylenediamine were dissolved in 14 ml of water.

Separately, 20 mg of ammonium persulfate was dissolved in 1 ml of water, and the thus prepared solution was mixed with the monomer solution. Then, the mixture was immediately poured into a mixture of 100 ml of liquid paraffin and 1 ml of sorbitan trioleate. and vigorously stirred in a nitrogen atmosphere.

After completion of polymerization, the thus formed polymers were thoroughly washed with hexane, and then with acetone to coagulate. Then, washing of the polymers was repeated alternately with an aqueous 50% acetone solution and an aqueous 70% acetone solution, and finally the polymers were dispersed in an aqueous 50% acetone solution.

A glass plate, 50×60 mm, patternwise vapor-deposited with a platinum semi-transparent film having a thickness of 150 Å as an anode and a nickel plate as a cathode were dipped in the polymer gel dispersion, and a voltage of 0.8V was applied therebetween to coagulate the polymer gel on the platinum pattern.

The gel-coagulated platinum electrode as a cathode and a glass plate, 50×60 mm, provided with an I.T.O film having a thickness of 2,000 Å on the entire surface by sputtering as an anode were confronted with each other while inserting a Mylar film having a thickness of 20 μm therebetween as a spacer.

An aqueous 60% acetone solution containing Brilliant Carmine 3B (C.I. Pigment Red 60: C.I. 16015-Lake), as dispersed in a ball mill, was filled in the clearance between the electrodes to prepare an optical device.

Display and light modulation

The same results as in Example 4 were obtained, when tested in the same manner as in Example 4.

EXAMPLE 6

Preparation of an optical device

The present optical device was prepared in the following manner.

0.75 g of acrylamide, 0.25 g of sodium methacrylate, 0.02 g of N,N-methylenebisacrylamide, and 50 μl of tetramethylethylenediamine were dissoled in 14 ml of water.

Separately, 20 mg of ammonium persulfate was dissolved in 1 ml of water, and the thus prepared solution was mixed with the monomer solution. Then, the mixture was immediately poured into a solvent mixture of 25 ml of carbon tetrachloride, 75 ml of toluene and 1 ml of sorbitan trioleate and vigorously stirred in a nitrogen atmosphere.

After completion of polymerization, the thus formed polymers were thoroughly washed with hexane, and then with acetone to coagulate. Then, washing of the polymers was repeated alternately with an aqueous 45% acetone solution and with an aqueous 70% acetone solution, and finally the polymers were swollen in an aqueous 50% acetone solution containing Vulkan Fast Orange GG (C.I. Pigment Orange 14: C.I. 21165), as dispersed in a ball mill.

A glass plate patternwise provided with an I.T.O electrode having a thickness of 2,000 Å by sputtering and a glass plate vapor-deposited with platinum having a thickness of 150 Å were confronted with each other with the respective electrodes being positioned inwardly, using a Mylar film having a thickness of 20 um as a spacer, and the said colored slurry was filled in the clearance between the electrode.

Display and light modulation

When a voltage of 0.8 to 5V was applied between the platinum semi-transparent electrode as a cathode and the I.T.O electrode as an anode in the thus prepared optical device, the gel existing between the electrodes underwent shrinking, and the space left by shrinking was occupied by the colored liquid, and showed the color of the colored liquid, when viewed from the side of the transparent protective plate 3.

On the other hand, when the switch was turned off to eliminated opplied voltage, the gel underwent swelling and showed the original light transmissivity.

As a result of repeated tests, the reproducibility was confirmed.

The display action and the light modulation action were thus confirmed.

EXAMPLE 7

Preparation of an optical device

The present optical device was prepared in the following manner.

On an ice bath, 0.75 g of acrylamide, 0.15 g of acrylic acid 0.02 g of N,N-methylenebisacrylamide, 20 μl of tetramethylethylenediamine, and 10 mg of ammonium persulfate were dissolved in a colored liquid containing 50 mg of Monastral Red (C.I. Pigment violet 19: C.I. 46500) dispersed in 14 ml of water in a ball mill. After nitrogen purge, polymerization was carried out at 20° C. 30 ml of water was added to the thus formed colored gel, and the mixture was pulverized in an emulator Then, the colored gel was washed alternately with an aqueous 70% acetone solution and with an aqueous 50% acetone solution, and finally dispersed in an aqueous 50% acetone solution to make a slurry.

A glass plate, 50×60 mm. patternwise vapor-deposited with a semi-transparent platinum film as an anode and a nickel plate as a cathode were dipped in the slurry at an inter-electrode distance of 0.3 mm, and a voltage of 0.8V was applied to deposit the gel on the platinum electrode.

The glass electrode and another glass electrode provided with an I.T.O film having a thickness of 2,000 Å on the entire surface were confronted with each other, while inserting a Mylar film having a thickness of 10 μm as a spacer, and an aqueous 65% acetone solution was filled in the clearance between the electrodes.

Display and light modulation

When a voltage of 0.8 to 5V was applied between the platinum semi-transparent electrode as a cathode and the I.T.O electrode as an anode in the thus prepared optical device, the colored gel existing between the electrodes underwent swelling and showed a light transmissivity.

On the other hand, when the switch was turned off to eliminate the applied voltage the colored gel shrank and the original opacity was recovered. As a result of repeated tests, the reproducibility was confirmed. The display action and the light modulation action were confirmed.

EXAMPLE 8

Preparation of an optical device

The present optical device was prepared in the following manner.

In an ice bath, 0.75 g of acrylamide, 0.18 g of methacrylic acid, 0.02 g of N,N-methylenebisacrylamide, 20 µl of tetramethylethylenediamine, and 10 mg of ammonium persulfate were dissoled in a colored liquid containing 50 mg of Monastral Red (C.I. Pigment violet 19: C.I. 46500) dispersed in 14 ml of water in a ball mill. After nitrogen purge, polymerization was carried out at 20° C. 30 ml of water was added to the thus formed colored gel, and then the mixture was pulverized in an emulator.

The colored gel was washed alternately with an aqueous 75% acetone solution and with an aqueous 45% accetone solution, and finally dispersed in an aqueous 45% acetone solution to make a slurry.

A glass plate, 50×60 mm, pattenwise vapor-deposited with a semi-transparent platinum film having a thickness of 150 Å as an anode and a nickel plate as a cathode were dipped in the slurry at an inter-electrode distance of 0.3 mm, and a voltage of 0.8V was applied therebetween to deposit the gel on the platinum electrode.

The glass electrode and a glass electrode provided with an I.T.O film having a thickness of 2,000 Å on the entire surface were confronted with each other while inserting a Mylar film having a thickness of 10 µm as a spacer, and an aqueous 65% acetone solution was filled in the clearance between the electrodes.

Display and light modulation

The same results as in Example 7 were obtained, when tested in the same manner as in Example 7.

EXAMPLE 9

Preparation of an optical device

The present optical device was prepared in the following manner.

On an ice bath, 0.75 g of acrylamide, 0.15 g of acrylic acid, 0.02 g of N,N-methylenebisacrylamide, 20 µl of tetramethylethylenediamine, and 10 mg of ammonium persulfate were dissoled in a colored liquid containing 60 mg of Diamond Black (C.I. Pigment Black 1: C.I. 50440) dispersed in 14 ml of water in a ball mill. After nitrogen purge, polymerization was carried out at 20° C. and 30 ml of water was added to the thus formed colored gel, and then the mixture was pulverized in an emulator.

The colored gel was washed alternately with an aqueous 90% methanol solution and with an aqueous 50% methanol solution, and finally dispersed in an aqueous 57% methanol solution to make a slurry.

A glass plate, 50×60 mm, patternwise vapor-deposited with a semi-transparent platinum film having a thickness of 150 Å and a glass plate deposited with an I.T.O electrode having a thickness of 2,000 Å by sputtering were confronted with each other while inserting a Mylar film having a thickness of 20 µm as a spacer therebetween, and the slurry was filled in the clearance between the electrodes.

Display and light modulation

When a voltage of 0.8 to 5V was applied between the platinum semi-transparent electrode as a cathode and the I.T.O electrode as an anode in the thus prepared optical device, the colored gel existing between the electrodes underwent shrinking, and the light put therein was absorbed.

On the other hand, when the switch was turned off to remove the applied voltage, the gel underwent swelling and recovered the original light transmissivity. As a result of repeated tests, the reproducibility was confirmed. The display function and the light modulation function were confirmed.

Effects

The main effects of the present invention are summarized as follows:

(1) Gel particles can be reduced in size to any minute dimension, and thus an output or an image with a clear and high resolving power can be obtained.

(2) Gel can be readily prepared, and thus an optical device can be readily prepared.

(3) There is no limit to the angle of visible field, and thus observation is possible at any angle.

(4) various coloring pigments can be used, and thus rich color display can be obtained.

What is claimed is:

1. An optical device comprising a liquid layer containing a liquid-absorbable and releasable polymer that absorbs and releases a liquid by action of an electric field and at least one pair of electrodes holding the liquid layer therebetween, said liquid-absorbable and releasable polymer having different properties of light scattering, light refraction, and light transmittance depending upon the action of the electric field.

2. An optical device according to claim 1, wherein the polymer absorbs a liquid on application of electric field and releases the liquid on elimination of the electric field.

3. An optical device according to claim 1, wherein the polymer releases a liquid on application of electric field and absorbs the liquid on elimination of the electric field.

4. An optical device, which comprises a liquid layer containing a liquid-absorbable and releasable polymer that absorbs and releases a liquid by action of an electric field, a colored liquid, and at least one pair of electrodes holding the liquid layer therebetween, said liquid-absorbable and releasable polymer having different properties of light scattering, light refraction, and light transmittance depending upon the action of the electric field.

5. An optical device according to claim 4, wherein the polymer absorbs a liquid on application of electric field and releases the liquid on elimination of the electric field.

6. An optical device according to claim 4, wherein the polymer releases a liquid on application of electric field and absorbs the liquid on elimination of electric field.

7. An optical device, which comprises a liquid layer containing a liquid-absorbable and releasable colored polymer that absorbs and releases a liquid by action of an electric field, and at least one pair of electrodes holding the liquid layer therebetween, said liquid-absorbable and releasable polymer having different properties of light scattering, light refraction, and light transmittance depending upon the action of the electric field.

8. An optical device according to claim 7, wherein the polymer absorbs a liquid on application of electric field and releases the liquid on elimination of electric field.

9. An optical device according to claim 7, wherein the polymer releases a liquid on application of electric field and absorbs the liquid on elimination of the electric field.

10. An optical device according to claim 1, wherein the liquid layer has a thickness of 1 to 1000 μm.

11. An optical device according to claim 1, wherein at least one of the electrodes is transparent.

12. An optical device according to claim 4, wherein the liquid layer has a thickness of 1 to 1000 μm.

13. An optical device according to claim 4, wherein at least one of the electrodes is transparent.

14. An optical device according to claim 7, wherein the liquid layer has a thickness of 1 to 1000 μm.

15. An optical device according to claim 7, wherein at least one of the electrodes is transparent.

16. An optical device according to claim 4, wherein the colored liquid comprises a coloring material and a solvent capable of dissolving or dispersing the coloring material.

17. An optical device according to claim 1, wherein the liquid-absorbable and releasable polymer is a cross-linked polymer.

18. An optical device according to claim 4, wherein the liquid-absorbable and releasable polymer is a cross-linked polymer.

19. An optical device according to claim 7, wherein the liquid-absorbable and releasable polymer is a cross-linked polymer.

* * * * *

UNITED STATES PATENT AND TRADEMARK OFFICE
CERTIFICATE OF CORRECTION

PATENT NO. : 4,779,962

DATED : October 25, 1988

INVENTOR(S) : Yukuo Nishimura, et al.

It is certified that error appears in the above-identified patent and that said Letters Patent is hereby corrected as shown below:

COLUMN 1

Line 11, change "particalarly" to --particularly--; and
    Line 57, change "contianing" to --containing--.

COLUMN 2

Line 20, delete "a";
    Line 42, change "tredemark" to --trademark--;
    Line 43, change "as" to --an--; and
    Line 51, change "condition." to --condition).--.

COLUMN 3

Line 38, change "apertures(which" to --apertures (which -- and "refered" to --referred--;
    Line 47, change "releases" to --release--;
    Line 54, change "perticles" to --particles--; and
    Line 56, change "apertures(which" to --apertures (which -- and "element")," to --element").--.

COLUMN 4

Line 18, change "very," to --very--;
    Line 25, change "th" to --the--;
    Line 27, delete "through.";
    Line 32, change "switoh (5-1)" to --switch (5-1)--;
    Line 60, change "an" to --any--; and
    Line 64, change "field." to --field,--.

UNITED STATES PATENT AND TRADEMARK OFFICE
CERTIFICATE OF CORRECTION

PATENT NO. : 4,779,962

DATED : October 25, 1988

INVENTOR(S) : Yukuo Nishimura, et al.

It is certified that error appears in the above-identified patent and that said Letters Patent is hereby corrected as shown below:

COLUMN 5

Line 3, change "filled." to --filled,--;
Line 5, change "perticles" to --particles--;
Line 62, change "colored gel(42) to --colored gel (4-2); and
Line 64, change "weakend" to --weakened--.

COLUMN 6

Line 5, change "light(91) to --light(9-1)--;
Line 14, change "moecules" to --molecules--;
Line 24, change "applicablc" to --applicable--;
Line 44, change "Than," to --Then,--;
Line 53, change "tho" to --the--;
Line 56, change "vapordepos-" to --vapor-depos---; and
Line 63, change "Plate" to --plate--.

COLUMN 8

Line 22, change "opaque" to --opaque.--;
Line 43, change "vigorous" to --vigorously--; and
Line 62, change "20 um" to --20 $\mu$m--.

UNITED STATES PATENT AND TRADEMARK OFFICE
CERTIFICATE OF CORRECTION

PATENT NO. : 4,779,962

DATED : October 25, 1988

INVENTOR(S) : Yukuo Nishimura, et al.

It is certified that error appears in the above-identified patent and that said Letters Patent is hereby corrected as shown below:

COLUMN 9

Line 9, change "to" to --the--; and
Line 26, change "trioleate." to --trioleate,--.

COLUMN 10

Line 53, change "emulator" to --emulator.--.

Signed and Sealed this

Twelfth Day of June, 1990

Attest:

HARRY F. MANBECK, JR.

*Attesting Officer*       *Commissioner of Patents and Trademarks*